United States Patent
Nordbruch et al.

(10) Patent No.: US 9,493,109 B2
(45) Date of Patent: Nov. 15, 2016

(54) METHOD AND CONTROL DEVICE FOR HIGHLIGHTING AN EXPECTED MOVEMENT PATH OF A VEHICLE

(75) Inventors: Stefan Nordbruch, Kornwestheim (DE); Roland Galbas, Ludwigsburg (DE); Armin Ruehle, Weinstadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 13/592,522

(22) Filed: Aug. 23, 2012

(65) Prior Publication Data

US 2013/0054089 A1 Feb. 28, 2013

(30) Foreign Application Priority Data

Aug. 23, 2011 (DE) .................. 10 2011 081 394

(51) Int. Cl.
| | | |
|---|---|---|
| *B60Q 1/08* | (2006.01) | |
| *B60Q 1/12* | (2006.01) | |
| *B60Q 1/18* | (2006.01) | |
| *B60Q 1/34* | (2006.01) | |
| *G08G 1/095* | (2006.01) | |
| *G08G 1/16* | (2006.01) | |

(52) U.S. Cl.
CPC ................ *B60Q 1/085* (2013.01); *B60Q 1/12* (2013.01); *B60Q 1/18* (2013.01); *B60Q 1/34* (2013.01); *G08G 1/095* (2013.01); *G08G 1/167* (2013.01); *B60Q 2300/14* (2013.01); *B60Q 2300/312* (2013.01); *B60Q 2300/32* (2013.01); *B60Q 2300/47* (2013.01); *B60Q 2400/50* (2013.01); *Y02B 20/72* (2013.01)

(58) Field of Classification Search
CPC .......... B60Q 1/085; B60Q 1/12; B60Q 1/24; B60Q 9/008; B60Q 1/1423; B60Q 1/0017; B60Q 1/484; F21S 8/086; F21V 23/0435; B60W 30/16; B60W 40/04; G01S 7/415; G01S 13/66; G08G 1/015; G06Q 30/0266
USPC .............. 701/36, 301, 300.301, 49; 340/435, 340/905, 468, 469, 903; 382/103; 35/294; 362/464, 466, 465; 315/294
See application file for complete search history.

(56) References Cited

U.S. PATENT DOCUMENTS

| | | | | |
|---|---|---|---|---|
| 4,768,135 | A * | 8/1988 | Kretschmer | ........... B60Q 1/085 362/277 |
| 5,673,039 | A * | 9/1997 | Pietzsch | ................. G08G 1/015 340/332 |
| 7,280,901 | B2 * | 10/2007 | Dubrovin | ............... B60Q 1/085 307/9.1 |

(Continued)

FOREIGN PATENT DOCUMENTS

| | | |
|---|---|---|
| DE | 36 01 388 | 7/1987 |
| DE | 101 34 594 | 1/2003 |

(Continued)

*Primary Examiner* — Yuri Kan
(74) *Attorney, Agent, or Firm* — Norton Rose Fulbright US LLP; Gerard Messina

(57) ABSTRACT

A method for highlighting an expected movement path of a vehicle, the method including a step of determining a traffic situation using an item of information concerning a surrounding environment of the vehicle. In addition, the method includes a step of determining the expected movement path based on the traffic situation. In addition, the method includes a step of providing a control signal for controlling a roadway marking device using the movement path in order to highlight the expected movement path.

18 Claims, 2 Drawing Sheets

(56) References Cited

U.S. PATENT DOCUMENTS

| | | | | |
|---|---|---|---|---|
| 2003/0147247 | A1* | 8/2003 | Koike | B60Q 1/484 362/464 |
| 2007/0222574 | A1* | 9/2007 | Courts | B60Q 1/24 340/468 |
| 2008/0122607 | A1* | 5/2008 | Bradley | B60Q 1/0017 340/468 |
| 2008/0297332 | A1* | 12/2008 | Suzuki | B60Q 1/24 340/435 |
| 2009/0016073 | A1* | 1/2009 | Higgins-Luthman | B60Q 1/085 362/465 |
| 2009/0041300 | A1* | 2/2009 | Mack | B60Q 1/085 382/103 |
| 2009/0066538 | A1* | 3/2009 | Thomas | G06Q 30/0266 340/903 |
| 2009/0072996 | A1* | 3/2009 | Schoepp | B60Q 1/1423 340/903 |
| 2010/0114490 | A1* | 5/2010 | Becker | B60W 30/16 701/301 |
| 2011/0074313 | A1* | 3/2011 | Gordin | 315/294 |
| 2012/0101711 | A1* | 4/2012 | Furmston | G01S 7/415 701/300 |
| 2013/0054089 | A1* | 2/2013 | Nordbruch et al. | 701/36 |

FOREIGN PATENT DOCUMENTS

| | | |
|---|---|---|
| DE | 102 54 806 | 6/2004 |
| DE | 10 2006 050 236 | 4/2008 |
| DE | 10 2008 061 747 | 6/2009 |
| DE | 10 2009 009 472 | 8/2010 |
| EP | 0565992 A2 | 10/1993 |
| EP | 1 334 869 | 8/2003 |
| JP | 5-65707 | 3/1993 |
| JP | 2010-20721 | 1/2010 |

* cited by examiner

METHOD AND CONTROL DEVICE FOR HIGHLIGHTING AN EXPECTED MOVEMENT PATH OF A VEHICLE

CROSS REFERENCE

The present application claims the benefit under 35 U.S.C. §119 of German Patent Application No. DE 102011081394.2 filed on Aug. 23, 2011, which is expressly incorporated herein by reference in its entirety.

FIELD OF THE INVENTION

The present invention relates to a method for highlighting an expected movement path of a vehicle, to a control device for highlighting an expected movement path of a vehicle, and to a corresponding computer program product.

BACKGROUND INFORMATION

When a plurality of drivers are traveling on a multilane roadway, dangerous situations may arise due to the behavior of the individual drivers. A dangerous situation may for example result if one of the drivers suddenly leaves his lane and moves into another lane. For this reason, conventional vehicles have a device (blinker) for indicating direction of travel in order to give other drivers an optical signal of an imminent change of direction or lane change.

German Patent Application No. DE 102 54 806 B4 describes a method for processing information from at least two information sources in a motor vehicle.

SUMMARY

Against this background, the present invention provides a method for highlighting an expected movement path of a vehicle, as well as a control device for highlighting an expected movement path of a vehicle, as well as, finally, a corresponding computer program product. Advantageous embodiments are described below.

The present invention is based on the recognition that the attentiveness of other drivers to future actions of a vehicle can be improved if a traffic space that will be occupied in the future by the vehicle is optically highlighted.

During an evasive maneuver, an evading vehicle may leave its lane so quickly that conventional travel direction indicators cannot provide useful information for the other drivers. In this case, a path that is to be traveled by the vehicle due to the evasive maneuver can be marked using a roadway marking device. By highlighting the foreseeable path, an immediate item of information can be communicated to other drivers concerning the immediately imminent movement path of the vehicle. For example, in the case of an emergency reaction of a driver assistance system, a movement path of the vehicle provided by the driver assistance system can be made visible to other drivers in the surrounding environment of the vehicle.

Moreover, the highlighting of a travel path proposed by a driver assistance system can help the driver of the vehicle, in a difficult traffic situation, to react to the proposal in an intuitively correct manner.

The present invention provides an example method for highlighting an expected movement path of a vehicle, the example method including the following steps:
determination of a traffic situation using an item of information concerning a surrounding environment of the vehicle;
determination of the expected movement path based on the traffic situation; and
provision of a control signal for controlling a roadway marking device using the movement path in order to highlight the expected movement path.

An expected movement path can be understood as a planned trajectory that can be determined based on background conditions resulting from the surrounding environment of the vehicle and on parameters of the vehicle. A traffic situation can on the one hand represent a course of the road and on the other hand can represent other drivers near the vehicle. For example, the traffic situation can represent the course of at least one traffic corridor in the environment around the vehicle, for example the course of a street. The traffic situation can also represent limits of the traffic space in the environment around the vehicle, such as obstacles. The traffic situation can also represent the traffic around the vehicle, for example the position, direction, and speed of other vehicles. The traffic situation can also represent local weather conditions and the effects thereof. The expected movement path can take into account the background conditions represented in the traffic situation and can for example lead past obstacles and other vehicles at a safe distance. The control signal can be provided at an interface to the roadway marking device in order to control the roadway marking device in a manner corresponding to the control signal. The roadway marking device can be fashioned so as to visually represent the expected movement path both to the driver of the vehicle and to other drivers. The roadway marking device can have one or more light sources that can be controlled by the control signal in order to highlight or illuminate the expected movement path. For the highlighting of the movement path, for example known technologies such as cornering lamps or moving light may be used. The expected movement path can be highlighted whenever it appears that this would make sense for the driver and/or for other drivers. In addition, the expected movement path can be highlighted if the expected movement path identifies, with a prespecified degree of probability, the actual future movement path of the vehicle. These decisions can be made using prespecified decision criteria, based on the traffic situation. The method for highlighting an expected movement path of a vehicle can be realized by a suitable device of the vehicle or by a device external to the vehicle.

The control signal can be fashioned so as to control at least one headlamp of the vehicle as the roadway marking device. The headlamp can be the main headlamp or headlamps of the vehicle. In this case, the main headlamp can project a light pattern that represents the movement path on the roadway. Alternatively or in addition, the headlamp can be a separate headlamp of the vehicle, present in addition to the main headlamp. Using the vehicle headlamps, the movement path can be marked by the vehicle itself.

The control signal can also be fashioned so as to control at least one lighting device external to the vehicle as the roadway marking device. The lighting device external to the vehicle can be for example a stationary street illumination device or a roadway surface capable of illumination. The street illumination device can be fashioned so as to project a light pattern, in response to the control signal, that highlights the movement path. A roadway surface capable of illumination can be understood as a roadway surface that has controllable light sources and/or light exit points and that is fashioned so as to radiate a light pattern, in response to the control signal, that highlights the movement path. The control signal can be transmitted wirelessly from the vehicle, for example by a transmitter, to a receiver of the roadway marking device. The movement path can be highlighted particularly clearly using infrastructure to mark the movement path. Because the infrastructure can be distributed along the roadway, the movement path can also be represented with a high degree of light intensity even at a large distance in front of the vehicle.

In addition, the control signal can be fashioned to control at least one headlamp of at least one other vehicle as the roadway marking device. Using headlamps of other vehicles to mark the movement path, the movement path can be depicted, independently of infrastructure, at a large distance and also laterally in front of the vehicle. The other vehicle is fashioned so as to receive the control signal from the vehicle and, in response to the control signal, to highlight the movement path of the vehicle. Vehicle headlamps on the other vehicle are situated so that they are able to illuminate a field of vision of a driver of the other vehicle. In this way, the expected movement path of the vehicle is highlighted at locations at which the need for information and usefulness of information is great, namely in the field of vision of the driver of the other vehicle.

The information about the surrounding environment can include a course of the roadway, recognized obstacles, weather conditions, and, additionally or alternatively, roadway conditions. In this way, the movement path can be determined taking these factors into account. For example, a reduced friction between the wheel and the roadway in wet conditions may be taken into account. Moisture on the roadway surface can also make orientation more difficult for the driver of the vehicle. If the orientation is more difficult, the movement path may be used as a recommendation to the driver. In the determination of the movement path, for example data from a navigation device can be taken into account.

The method can include a step of receiving traffic data from at least one other vehicle or from persons sending first-person object information, such that in the step of determination the traffic situation is additionally determined using the traffic data. The traffic data can be received via an interface at the other vehicle. The traffic data can represent the traffic situation from an angle of view of the other vehicle. The traffic data can also include parameters of the other vehicle, for example a position, direction of travel, and speed of travel. With the help of the traffic data, the traffic situation can be acquired in a manner that looks ahead, for example around curves. An estimated movement path of the other vehicle can also be taken into account in the determination of the expected movement path.

In the determination step, the expected movement path can be determined using a speed of the vehicle and/or a direction of the vehicle. Using such vehicle parameters, the movement path can be determined with a higher degree of precision than is possible without them. In this way, an uncertainty factor during the determination can be reduced, and the movement path can be planned so as to move past obstacles and other vehicles with a smaller safety distance.

The present invention also provides an example method for highlighting an expected movement path of a vehicle using a roadway marking device situated in the environment surrounding the vehicle, the example method having the following features:

reception of a control signal according to the approach proposed here via an interface to the vehicle; and
controlling of the roadway marking device using the control signal in order to highlight the expected movement path.

The roadway marking device can for example be a device for illuminating the roadway. The interface can be understood as a receive device for receiving the wirelessly transmitted control signal. By highlighting the movement path of the vehicle, the movement path of the vehicle can be marked in a larger zone around the vehicle than by the other vehicle itself. The roadway marking device situated in the environment around the vehicle can also be situated in another vehicle. In this case, the expected movement path of the vehicle is shown specifically for the driver of the other vehicle.

In addition, the present invention provides an example control device for highlighting an expected movement path of a vehicle, the example control device having the following features:

a device for determining a traffic situation using an item of information concerning an environment surrounding the vehicle;
a device for determining the expected movement path based on the traffic situation: and
a device for providing a control signal for controlling a roadway marking device using the movement path in order to highlight the expected movement path.

An object of the present invention can also be achieved rapidly and efficiently by this variant embodiment of the present invention in the form of a control device. In the present context, a control device can be understood as an electrical device that processes sensor signals and outputs control signals as a function thereof. The control device can have an interface that can be fashioned as hardware and/or as software. In the case of a realization as hardware, the interfaces can for example be part of a so-called system ASIC that contains a wide range of functions of the control device. However, it is also possible for the interfaces to be separate integrated circuits, or at least to be made up partly of discrete components. In the case of a realization in software, the interfaces can be software modules that are for example present on a microcontroller alongside other software modules. The control device, or a corresponding realized device, can be situated inside the vehicle or outside the vehicle. If the control device is situated outside the vehicle, the control device can be coupled to the vehicle via a suitable interface, for example a radio connection.

Also advantageous is a computer program product having program code that can be stored on a machine-readable carrier such as a semiconductor storage device, a hard drive, or an optical storage device, and can be used to carry out the method according to one of the above-described specific embodiments when the program is executed on a computer or a device.

Below, the present invention is explained in exemplary fashion in more detail on the basis of the figures.

DETAILED DESCRIPTION OF EXAMPLE EMBODIMENTS

Figure 1:
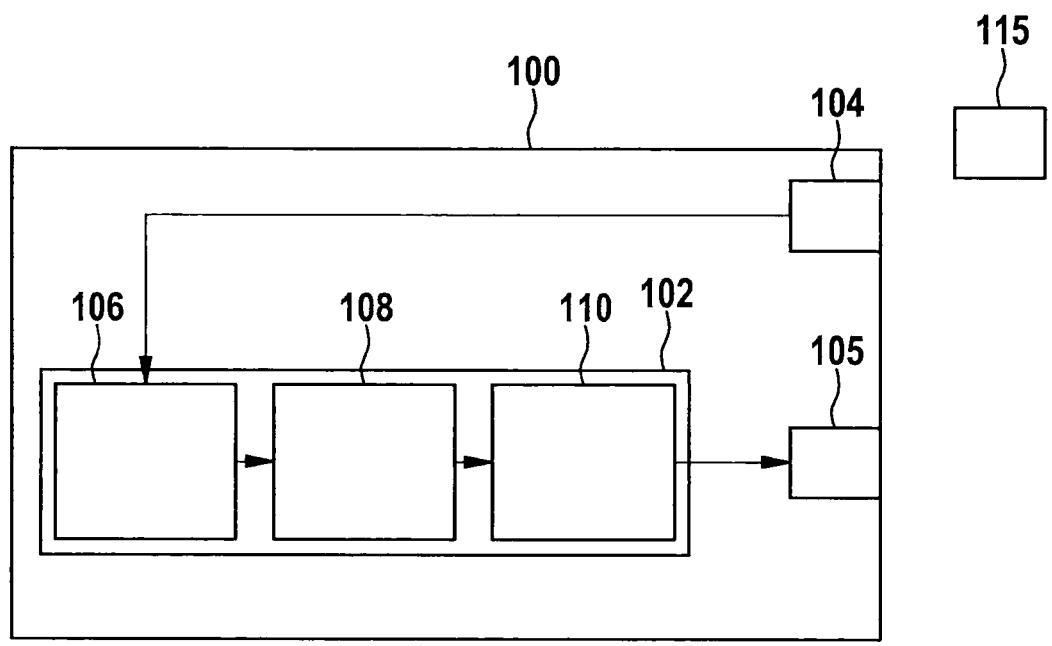
FIG. 1 shows a schematic representation of a vehicle having a control device for highlighting an expected movement path of a vehicle according to an exemplary embodiment of the present invention.

In the following description of preferred exemplary embodiments of the present invention, identical or similar reference characters are used for elements that are shown in the various Figures and that act similarly, repeated description of these elements being omitted.

FIG. 1 shows a representation of a vehicle 100 having a control device 102 for highlighting an expected movement path of vehicle 100 according to an exemplary embodiment of the present invention. Vehicle 100 has a device 104 for receiving information concerning a surrounding environment of vehicle 100. Device 104 can be a camera of vehicle 100. Control device 102 is fashioned so as to determine, based on the information about the surrounding environment of vehicle 100 and, if warranted, driving parameters of vehicle 100, an expected movement path of vehicle 100, and to produce and output a suitable control signal for controlling a roadway marking device. The control signal is fashioned so as to control the roadway marking device in such a way that the expected movement path is highlighted by the roadway marking device. According to this exemplary embodiment, vehicle 100 is fashioned so as to highlight the expected movement path using a headlamp 105 of vehicle 100. For example, a segment of the roadway situated in front of vehicle 100 can be illuminated by headlamp 105 in such a way that the expected movement path is visible both to the driver of vehicle 100 and to other drivers. Vehicle 100 can follow the expected movement path, controlled by a driver assistance system or controlled by the driver of vehicle 100. If the vehicle is controlled by a driver assistance system, the highlighting of the expected movement path can be used to warn or inform other drivers. If the vehicle is controlled by the driver, the highlighting of the expected movement path can additionally act as an aid to the driver.

According to this exemplary embodiment, control device 102 has a device 106 for determining a traffic situation, a device 108 for determining an expected movement path, and a device 110 for providing a control signal. Device 106 for determining is fashioned so as to use information provided by device 104 concerning the environment surrounding vehicle 100 to determine a traffic situation relating to the environment surrounding vehicle 100. The device for determining 108 is fashioned so as to determine the future expected movement path of vehicle 100, based on the determined traffic situation. The device for providing 110 is fashioned so as to use the expected movement path to produce and provide the control signal for controlling the roadway marking device, here headlamp 105.

According to an exemplary embodiment, an alternative or additional roadway marking device 115 can be situated outside vehicle 100 shown in FIG. 1. In this case, control device 102 of vehicle 100 can be fashioned to provide the control signal, or an item of information about the expected movement path of vehicle 100, to an interface for transmission to external roadway marking device 115. External roadway marking device 115 can be fashioned so as to receive the control signal or the item of information concerning the expected movement path and, in response thereto, to highlight the expected movement path of vehicle 100. In addition, external roadway marking device 115 can communicate, from vehicle 100, an item of information concerning a current position of vehicle 100. Alternatively, external roadway marking device 115 can have a device for acquiring the current position of vehicle 100. The current position can be used as a starting point for the expected movement path of vehicle 100.

Figure 2:
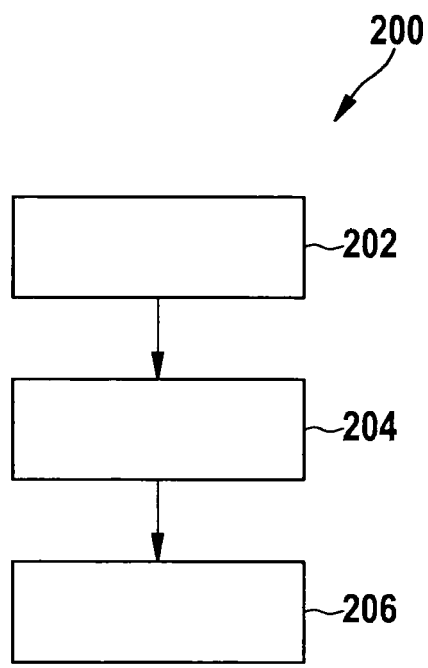
FIG. 2 shows a flow diagram of a method for highlighting an expected movement path of a vehicle according to an exemplary embodiment of the present invention.

FIG. 2 shows a flow diagram of a method 200 for highlighting an expected movement path of a vehicle according to an exemplary embodiment of the present invention. Method 200 can be executed on a control device as shown in FIG. 1. Method 200 has a determination step 202, a determination step 204, and a provision step 206. In determination step 202, a traffic situation is determined using an item of information concerning an environment surrounding the vehicle. In determination step 204, the expected movement path is determined based on the traffic situation. In provision step 206, a control signal for controlling a roadway marking device using the movement path is provided in order to highlight the expected movement path.

Figure 3:
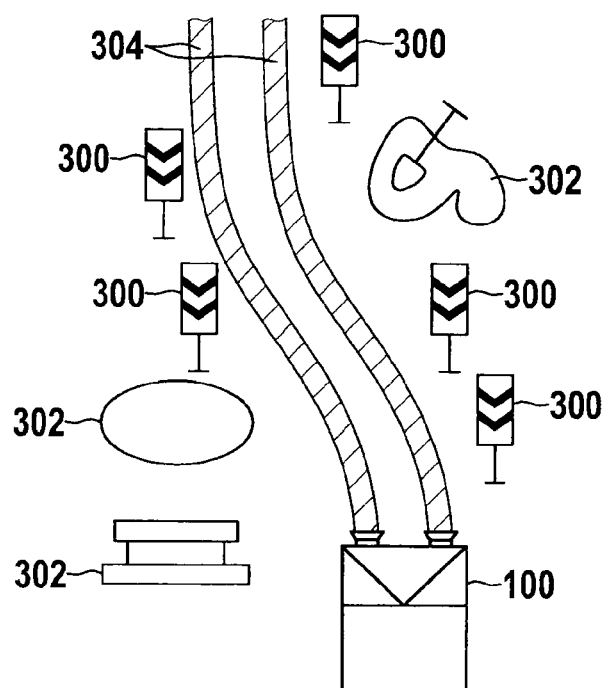
FIG. 3 shows a representation of a vehicle in a difficult traffic situation with a highlighted movement path according to an exemplary embodiment of the present invention.

FIG. 3 shows a depiction of a vehicle 100 in a "construction site" traffic situation, according to an exemplary embodiment of the present invention. The construction site has guide devices 300, here reflective warning posts, that laterally limit a lane in front of vehicle 100. The lane limited in this way leads between obstacles 302. Due to the reflective warning posts 300, which are highly reflective at night, and due to further visual hindrance by obstacles 302, it is difficult for a driver of vehicle 100 to discern the lane. A surrounding environment of vehicle 100 is acquired via an environment acquisition device, for example the camera described on the basis of FIG. 1. A suitable device of vehicle 100, for example the control device described on the basis of FIG. 1, is fashioned so as to determine, based on the information provided by the environment acquisition device, an item of information concerning the highlighting of an expected movement path 304 of vehicle 100. During the determination of expected movement path 304, the lane is recognized as drivable. The lane is thus determined as expected movement path 304, and a control signal for headlamps of vehicle 100 is provided. The control signal is fashioned so as to control the headlamps in such a way that the headlamps project expected movement path 304 as an image of tire tracks on the roadway. Through the projected tire tracks, the driver of vehicle 100 can easily and reliably discern the lane and follow it. Alternatively or in addition to the representation of the tire tracks, the headlamps can be controlled so as to highlight some other suitable lane guiding line or the curve of the roadway or the lane.

In other words, FIG. 3 shows a representation of a trackline light that is produced by a method for producing a lane guide 304 using light according to an exemplary embodiment of the present invention. A complex or difficult-to-recognize lane will result in a more difficult orientation for lane guidance. Such situations occur for example when there are unusual changes in the lane, e.g., due to construction sites, but may also occur for example at complex intersections. Such situations are also made more difficult for example in poor visibility conditions or due to self-caused or external glare. Typical indicators of such a situation are for example night, rain, a large number of irregular construction site lights, various reflections, other drivers, and lane markings that are no longer recognizable, or a misleading route of the lane. That is, existing lane marking paths and objects produce a conflict in driving guidance.

People whose night vision is weak and who have poor ability to orient themselves in complex situations, e.g., older drivers, are above all concerned here. In order to support the driver, environment sensor systems such as video sensor systems or radar sensor systems, or additional systems such as TOF (Time Of Flight—such as PMD), are increasingly used in vehicles. In addition, recourse may be had to vehicle-to-vehicle communication, or vehicle-to-infrastructure communication, in order to obtain environmental information. In addition, vehicle roadway illumination systems, for example headlamps, having the capability of variable light positioning and variable intensity settings, i.e., variable light beam orientation, may be used as a roadway marking device.

A method according to the approach proposed here recognizes when a difficult orientation to the lane guidance is present due to complex or difficult-to-recognize lane markings. In addition, impaired visibility, due for example to weather conditions or to glare, is recognized. From this information, according to the method typical lane guidance features and objects relevant to the lane guidance are determined.

Subsequently, a probability is estimated that represents a need for support for the driver for lane guidance. On the basis of typical lane guidance features and recognized objects, a lane guidance is estimated for a lane with maximum probability. If the estimated probability favors driver support, and if the estimated probability justifies a robust guidance recommendation, then the lighting system produces a driving recommendation for the driver represented by light focusing, e.g., by indicating tire tracks as shown in FIG. 3.

Figure 4:
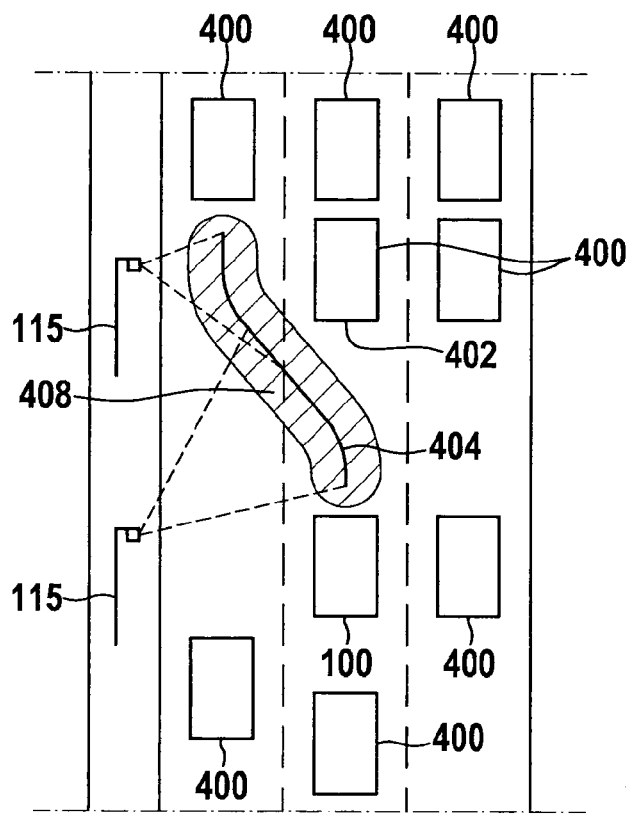
FIG. 4 shows an illuminated roadway with vehicles in a traffic jam, wherein, according to an exemplary embodiment of the present invention, an illumination is controlled by the vehicle through information concerning the escape trajectory provided to the intelligent roadway illumination system.

FIG. 4 shows a controlling of an intelligent street illumination system for warning drivers 400 in the case of an automatic or driver-controlled evasive action of a vehicle 100 according to an exemplary embodiment of the present invention. Vehicle 100 is moving on a multilane roadway on which other drivers 400 are also situated. On the roadway there are situated two rows of stationary vehicles 400. In the first row, three vehicles 400 are situated alongside one another. In the second row, two vehicles 400 are situated alongside one another, one of these vehicles 400 being situated in the lane of vehicle 100. Stationary vehicles 400 mark the end 402 of a traffic jam. Next to vehicle 100, a further vehicle 400 is moving towards the end of the traffic jam. Two additional moving vehicles 400 follow behind vehicle 100.

During the approach to the end 402 of the traffic jam, vehicle 100, equipped with corresponding sensory mechanisms such as radar, video, lidar, or speed sensors, can recognize whether the braking distance is sufficient to avoid a collision with a vehicle 400 standing at end 402 of the traffic jam. If this is not possible, then, through calculation of an evasion trajectory 404, an evasion may be triggered by vehicle 100 itself or by the driver. However, this will not be recognizable in time by following traffic 400. An automatic evasion of vehicle 100, without warning other drivers 400, is however dangerous. In such a stressful situation, a warning through blinking will be detected by the driver of a following vehicle 400 only with difficulty. Therefore, according to this exemplary embodiment, following vehicles 400 are warned by a display of the direction of evasion in which vehicle 100 will move.

Other drivers 400 are made aware of an evasion trajectory 404, calculated by vehicle 100 in order to prevent an accident, by an illumination 408. Illumination 408 of evasion trajectory 404 can take place either via the headlamps of vehicle 100 itself, as described on the basis of FIG. 3, or through an intelligent street illumination 115 with communication capacity, or through other vehicles 400. The evasion trajectory can also be highlighted by a combination of these possibilities for highlighting the expected movement path of vehicle 100.

In the case of an illumination 408 by an intelligent street illumination system 115, the evasion trajectory 404 calculated by vehicle 100 is communicated to intelligent street illumination system 115. This can take place using radio systems, such as for example wireless LAN. Intelligent street illumination system 115 can, on the basis of the calculated evasion trajectory, particularly illuminate a driving loop 404 calculated by vehicle 100, in order in this way also to inform other drivers 400, in particular traffic following behind, but also to inform persons on the edge of the roadway or traffic in the other direction concerning the intention to evade. In addition, following vehicles 400 can also be informed via Car2Car communication in order to enable an automatic braking of following vehicles 400.

An intelligent street illumination system 115 can include any type of street illumination system 115, including streetlights and self-illuminating road surfaces, or may also be realized by a roadway having a controllable self-illuminating surface. The necessary information for street illumination 408 is the evasion trajectory 404 determined in the vehicle.

In the case of an illumination 408 by the vehicle's own headlamps, the calculated evasion trajectory 404 is illuminated on the roadway using the vehicle's own headlamps. In the case of headlamps, this can take place using the cornering lamps or by screening out some areas. As vehicle 100 can illuminate its own path 404, it is possible for vehicle 100 to illuminate a path for other vehicles 400. In this case, vehicle 100 can receive a corresponding control signal from another vehicle 400.

Through the highlighting of expected movement path 404, following vehicles 400 or the drivers thereof are optically warned by illumination 408 that this area is no longer available for them to drive on, because the area highlighted by illumination 408 is being used by vehicle 100. In this way, collisions can be avoided.

Vehicle 100 can receive further information from vehicles 400 having sensory systems for recognizing a possible accident concerning the possibility of communication of vehicles 400 with the surrounding environment or with the infrastructure (Car2X). A controllable intelligent street illumination system 115 can for example illuminate little-used streets only when these are actually being used. Controllable headlamps of vehicle 100, e.g., cornering lamps or additional headlamps for an extra illumination of particular areas or street segments, can highlight corresponding street areas.

The exemplary embodiments described and shown in the Figures have been selected only as examples. Different exemplary embodiments may be combined with one another in their entirety or only with regard to individual features. An exemplary embodiment may also be supplemented with features of another exemplary embodiment.

What is claimed is:

1. A method for illuminating an expected movement path of a vehicle, comprising:
   detecting, by a camera, at least one item of information concerning an environment surrounding the vehicle;
   determining, by a control device in the vehicle, the following:
   a traffic situation using the detected at least one item of information, and
   the expected movement path of the vehicle based on the traffic situation;

generating, by the control device, a control signal to control a roadway marking device in a manner corresponding to the control signal, the roadway marking device including a receiver, a processing device, and illumination elements;

transmitting, by a transmitter in the vehicle, the control signal from the vehicle and to the receiver of the roadway marking device; and illuminating, by the illumination elements of the roadway marking device, the expected movement path of the vehicle according to the control signal received by the roadway marking device, wherein the roadway marking device is remote to the vehicle, wherein the expected movement path of the vehicle is a planned trajectory of the vehicle, wherein the roadway marking device includes at least one of: at least one other vehicle, a streetlight, and a roadway surface capable of illumination.

2. The method as recited in claim 1, wherein the roadway marking device includes at least one vehicle-external illumination device.

3. The method as recited in claim 1, wherein the item of information concerning the surrounding environment includes at least one of a course of the roadway, recognized obstacles, weather conditions, and roadway conditions.

4. The method as recited in claim 1, further comprising:
receiving traffic data one of from at least one other vehicle or from persons who send first-person object information, the traffic data being further considered in the determining the traffic situation.

5. The method as recited in claim 1, wherein, the determining the expected movement path of the vehicle includes using at least one of a speed of the vehicle and a direction of the vehicle.

6. A method for illuminating an expected movement path of a vehicle using a roadway marking device situated in an environment surrounding the vehicle, the method comprising:

detecting, by a camera, an item of information concerning the environment surrounding the vehicle;

determining, by a control device in the vehicle, the following:

a traffic situation using the detected item of information, and the expected movement path of the vehicle based on the traffic situation;

generating, by the control device, a control signal to control the roadway marking device in a manner corresponding to the control signal, the roadway marking device including a receiver, a processing device, and illumination elements;

transmitting, by a transmitter in the vehicle, the control signal from the vehicle and to the receiver of the roadway marking device;

receiving a control signal at the roadway marking device via an interface to the vehicle; and controlling the illumination elements of the roadway marking device to illuminate the expected movement path of the vehicle according to the control signal received by the roadway marking device, wherein the environment surrounding the vehicle, in which the roadway marking device is situated, is remote to the vehicle, and wherein the expected movement path of the vehicle is a planned trajectory of the vehicle, wherein the roadway marking device includes at least one of: at least one other vehicle, a streetlight, and a roadway surface capable of illumination.

7. A control device for illuminating an expected movement path of a vehicle, the control device comprising:

a device in the vehicle configured to:

receive, from a camera, an item of information concerning a surrounding environment of the vehicle, and determine a traffic situation using the received item of information concerning the surrounding environment of the vehicle;

a device in the vehicle configured to determine the expected movement path of the vehicle based on the traffic situation; and a device in the vehicle including a transmitter, the device configured to:

generate a control signal to control, in a manner corresponding to the control signal, a roadway marking device including a receiver, a processing device, and illumination elements, transmit, by the transmitter, the control signal from the vehicle and to the receiver of the roadway marking device in order to illuminate, by the illumination elements of the roadway marking device, the expected movement path of the vehicle according to the control signal, wherein the roadway marking device is remote to the vehicle, and wherein the expected movement path of the vehicle is a planned trajectory of the vehicle, wherein the roadway marking device includes at least one of: at least one other vehicle, a streetlight, and a roadway surface capable of illumination.

8. A computer program product having program code for illuminating an expected movement path of a vehicle, the program code, when executed by a processor, causing the processor to perform:

detecting, by a camera, at least one item of information concerning an environment surrounding the vehicle;

determining, by a control device in the vehicle, the following:

a traffic situation using the detected at least one item of information, and the expected movement path of the vehicle based on the traffic situation;

generating, by the control device, a control signal to control a roadway marking device in a manner corresponding to the control signal, the roadway marking device including a receiver, a processing device, and illumination elements;

transmitting, by a transmitter in the vehicle, the control signal from the vehicle and to the receiver of the roadway marking device; and illuminating, by the illumination elements of the roadway marking device, the expected movement path of the vehicle according to the control signal received by the roadway marking device, wherein the roadway marking device is remote to the vehicle, and wherein the expected movement path of the vehicle is a planned trajectory of the vehicle, wherein the roadway marking device includes at least one of: at least one other vehicle, a streetlight, and a roadway surface capable of illumination.

9. The method as recited in claim 1, wherein the roadway marking device is visible to other drivers.

10. The method as recited in claim 4, wherein the traffic data includes at least one of a traffic situation from an angle of view of an other vehicle and parameters of the other vehicle, wherein the other vehicle is situated in traffic surrounding the vehicle.

11. The method as recited in claim 10, wherein the parameters of the other vehicle include at least one of a direction of travel of the other vehicle, a position of the other vehicle, and a speed of travel of the other vehicle.

12. The control device as recited in claim 7, wherein the device configured to determine a traffic situation using an item of information concerning a surrounding environment of the vehicle is at least one of a camera, radar, lidar, and speed sensors.

13. The method as recited in claim 1, further comprising:
implementing an evasion tactic, wherein the evasion tactic is performed by at least one of a driver or a vehicle system.

14. The method as recited in claim 1, wherein the expected movement path of the vehicle has a width that does not exceed a travel lane width.

15. The method as recited in claim 6, wherein the expected movement path of the vehicle has a width that does not exceed a travel lane width.

16. The control device as recited in claim 7, wherein the expected movement path of the vehicle has a width that does not exceed a travel lane width.

17. The computer program product as recited in claim 8, wherein the expected movement path planned trajectory of the vehicle has a width that does not exceed a travel lane width.

18. The method as recited in claim 1, wherein the roadway marking device includes at least one headlamp of the at least one other vehicle.

* * * * *